Sept. 16, 1958 J. J. RILEY ET AL Re. 24,533
TIMING AND SEQUENCING CIRCUIT
Original Filed Oct. 19, 1951
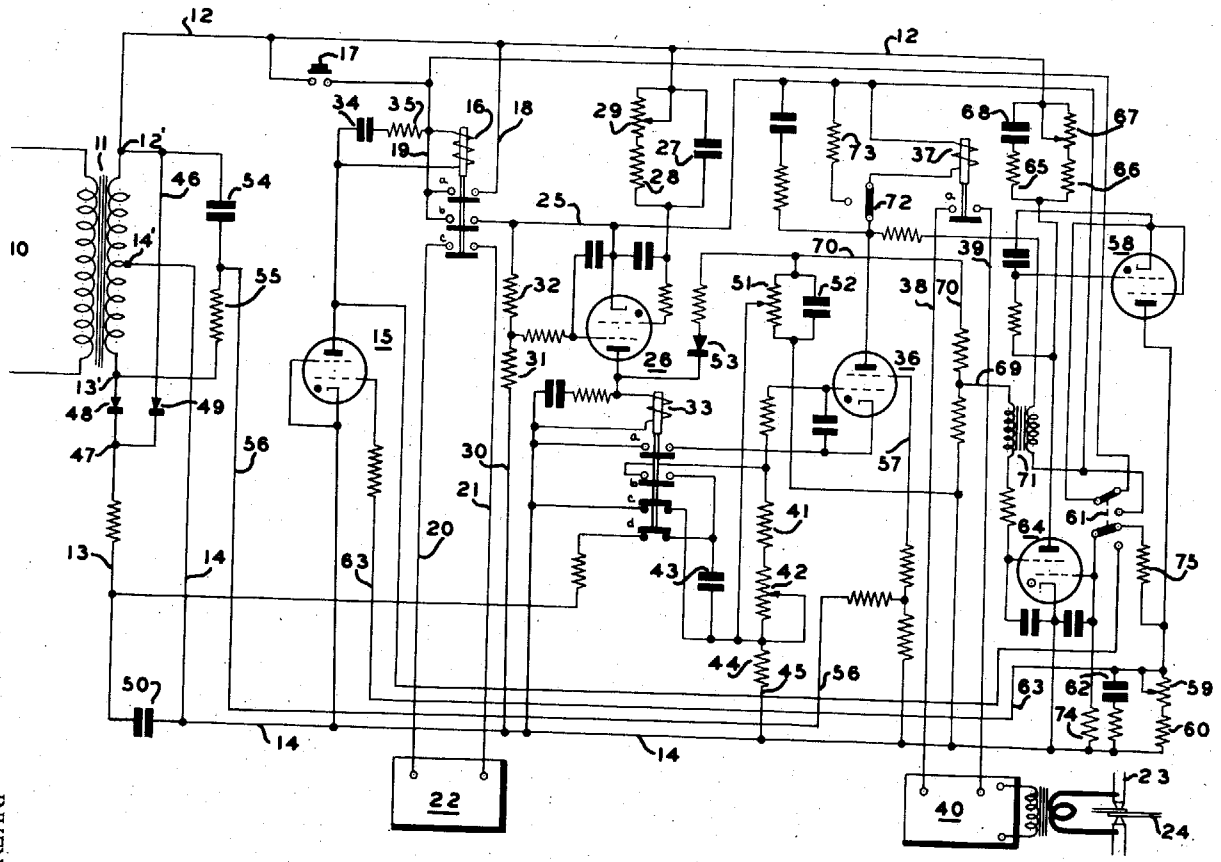
INVENTORS
JOSEPH J. RILEY
RICHARD ALM
BY Francis J. Klempay
ATTORNEY United States Patent Office Re. 24,533
Reissued Sept. 16, 1958

24,533

TIMING AND SEQUENCING CIRCUIT

Joseph J. Riley, Warren, Ohio, and Richard Alm, Chicago, Ill., assignors to The Taylor-Winfield Corporation, Warren, Ohio, a corporation of Ohio Original No. 2,660,654, dated November 24, 1953, Serial No. 252,148, October 19, 1951. Application for reissue September 30, 1954, Serial No. 459,573

4 Claims. (Cl. 219—108)

Matter enclosed in heavy brackets [ ] appears in the original patent but forms no part of this reissue specification; matter printed in italics indicates the additions made by reissue.

The present invention relates to electronic timing and control circuits, and more particularly to an improved and simplified electronic sequence control timer for use in electric resistance welding machines and the like.

An object of the present invention resides in the provision of electronic timing circuit for timing and controlling a plurality of sequentially related operations or control phases, wherein certain novel circuit arrangements are utilized to insure accurate and thoroughly dependable performance regardless of substantial variations in the line voltage applied thereto. By the teachings of our invention this may be accomplished without ancillary voltage control and regulation equipment as will appear.

Another object of the present invention is the provision in a timing circuit for timing a plurality of sequentially related control phases, of an arrangement whereby a particular phase of control is regulated in such manner that deleterious results are avoided in the event of untimely breakdown of certain of the circuit components.

More specifically the present invention seeks to provide a control circuit utilizing a plurality of electronic discharge devices arranged for sequentially related timed periods of conduction, wherein after initiation of conduction in certain of the discharge devices, the termination of conduction therein after a predetermined time interval is wholly independent of subsequent initiation of conduction in certain other of said sequentially related discharge devices. Thus, for example, in using our timer for controlling electric resistance welding apparatus, the "weld time" period may be initiated and terminated by the same means, whereby should the said means fail to function the "weld time" period will not be initiated, or if initiated, will terminate.

Another object of the present invention is the provision in an electronic timing circuit, particularly for use in controlling sequential operations of electric resistance welders, of an improved means, operative upon termination of the "weld time" period, to prevent untimely reinitiation of said period during subsequent sequential operations of the same cycle.

Yet another object of the present invention is the provision of a novel electronic control circuit for controlling a plurality of sequentially related operations wherein a minimum number of electric discharge devices is required to control a given number of sequential operations.

Ancillary objects of the invention include the provision of an electronic control circuit having the above enumerated characteristics which is inexpensive to produce, does not require a direct current power source, and in which each of the electric discharge devices used may be of the same style and size to facilitate maintenance and repair.

Other objects and advantages of the invention will become apparent upon full consideration of the following detailed specification and accompanying drawing wherein is illustrated a certain preferred embodiment of our invention.

The sole figure of the drawing is a schematic representation of a control circuit constructed according to the teachings of our invention and associated with conventional electric resistance welding equipment.

In the drawing, the reference numeral 10 designates a commercial alternating current power source, to which is connected the primary winding of a transformer 11. The secondary of the transformer 11 is provided with terminals 12' and 13', and center tap 14', connecting respectively conductors 12, 13 and 14. Connected between conductors 12 and 14 are, in series relation, a gaseous discharge device 15, relay 16 and a starting switch 17, the latter preferably being of the type which is controllable by the foot of the machine operator. As will be observed, closing of switch 17 will energize discharge device 15 and thus cause relay 16 to close. Contacts 16a of relay 16, in cooperation with conductors 18 and 19, form a holding circuit in parallel with the switch 17 whereby the latter may be but momentarily closed to initiate a cycle of operations. Contacts 16c of relay 16 connect conductors 20 and 21 leading to a mechanical control panel 22, and in the illustrated application of the control circuit it is contemplated that the closing of contacts 16c will cause movement of welding electrodes 23 toward and into contact with workpieces 24. In accordance with usual practice capacitor 34 and resistor 35 are provided in shunt relation to relay 16 whereby energy may be stored during the conducting [half-cycle] *half-cycles,* of discharge device 15 and discharged through the relay during alternate non-conducting [half-cycle] *half-cycles,* whereby the relay will be maintained in an energized condition.

Closing of contacts 16b connects conductor 12 to conductor 25 and accordingly applies anode-cathode voltage to another gaseous discharge device 26 which will then fire upon proper conditioning of its control and screen grids as will be apparent. In the resistance welding art it is desirable to provide a certain time interval or "squeeze time" between the moving of electrodes 23 into contact with the workpieces 24 and the subsequent application of welding energy thereto. Accordingly it is preferable to condition the control grid of discharge device 26 with a normally negative hold-off signal whereby the same will be maintained in a non-conductive state for a predetermined time interval after the closing of relay 16. This may be accomplished by providing a time constant network, comprising capacitor 27, resistor 28 and potentiometer 29, in the grid circuit of discharge device 26, which circuit is connected to conductor 12. To charge the capacitor 27 we have provided conductor 30 and resistors 31 and 32 which are connected between conductors 14 and 25; the arrangement being such that the cathode of discharge device 26 is in communication with conductor 14 through resistors 31 and 32 whereby before contacts 16b are closed capacitor 27 becomes charged through grid rectification of discharge device 26. The charge assumed by capacitor 27 provides a highly negative grid signal for discharge device 26 upon closing of contacts 16b, and the latter will accordingly remain non-conductive until the charge has been sufficiently dissipated through resistor 28 and potentiometer 29.

For additional control of discharge device 26 we have connected the screen grid thereof to conductor 30 at a point between resistors 31 and 32. A positive and in-phase bias signal is thus provided which is sufficient to fire the discharge device 26 as it approaches a conductive state through dissipation of its negative control grid bias. This feature insures that firing will take place at the proper point in the applied anode-cathode voltage cycle, but does not otherwise affect the timing.

Connected in series with the anode of discharge device 26 is a relay 33, normally open contacts 33a of which are connected in series with the cathode of another discharge device 36. Relay 33 is energized upon initiation of conduction in discharge device 26, and according to the principles of our invention the resulting closing of contacts 33a applies anode-cathode potential to discharge device 36 to immediately initiate conduction therein. A relay 37 which is connected in series with the anode of discharge device 36 thus becomes energized and normally open contacts *37a* [33a] thereof close to connect conductors 38 and 39 leading to a conventional weld current contactor 40; it being contemplated that the connecting of the last mentioned conductors 38 and 39 will energize the contactor 40 to permit welding energy to pass to the electrodes 23 to perform a weld.

Since the flow of weld current is thus directly dependent upon conduction in discharge device 36 "weld time" may be controlled by timing the duration of conduction of the said device 36. For this purpose we have provided a control grid circuit comprising resistor 41, potentiometer 42, capacitor 43 and normally open contacts 33b. This circuit is referenced to the cathode of discharge device 36 through resistor 44 and conductor 45, as shown. A highly positive initial signal is desired so that the device 36 will fire immediately upon energization of relay 33 and closing of contacts 33a and for this purpose we have connected capacitor 43, through normally closed contacts 33c and 33d to a fullwave direct current charging circuit comprising conductors 46 and 47, rectox units 48 and 49, and capacitor 50. As will be observed the arrangement is such that with relay 33 in a deenergized condition, capacitor 43 is disconnected from the control grid circuit for discharge device 36 and is connected to the terminals of the above described direct current charging circuit. Upon relay 33 being energized by firing of discharge device 26 contacts 33c and 33d open and, contacts 33b close, simultaneously disconnecting capacitor 43 from its charging circuit and connecting it into the control grid circuit for discharge device 36. It will be noted that the charge existing in capacitor 43 impresses a highly positive grid signal on the discharge device 36, and the latter, having anode-cathode potential applied thereto by the closing of contacts 33a, begins to conduct immediately. The charge of capacitor 43 dissipates according to the R–C time constant factor of the network 41, 42 and 43 so that after a predetermined period the discharge device 36 will have substantially no positive signal from capacitor 43. [To insure that the discharge device 36 ceases to conduct after such predetermined period we have impressed a second signal upon its control grid which has the effect of referencing the positive signal of capacitor 43 to a potential below that of the cathode of discharge device 36. Thus as the charge on capacitor 43 dissipates to a low value the control grid of discharge revice 36 will become negative with respect to its cathode and will accordingly prevent further conduction. The last mentioned signal is provided by means a potentiometer 51 which is connected at one side to the cathode of discharge device 36 and at the other side to the anode of discharge device 26; the arrangement being such that a voltage drop appears across the terminals of potentiometer 51 where discharge device 26 is conducting. It will be noted that the potential of the anode of discharge device 26, when the latter is conducting, will be negative with respect to the cathode of discharge device 36, and thus, by suitably adjusting the sliding tap of potentiometer 51 and connecting the same in the control grid circuit for discharge device 36 we provide a negative reference bias therefor. As is indicated by the drawing it is preferable to connect a capacitor 52 in parallel with potentiometer 51 to partially filter the periodical voltage impulses appearing thereacross, and to include a rectox unit 53 between last mentioned capacitor 52 and the anode of discharge device 26 to undesirable feedback of the charge upon capacitor 52.]

*To insure that the discharge device 36 ceases to conduct after such predetermined period we provide a source of negative grid potential which is always activated synchronously with conduction in discharge device 26 and which is connected to a terminal of timing capacitor 43. This source comprises a parallel capacitor-potentiometer network 51—52 which is connected in series with the anode of discharge device 26 and rectifier 53, across the power supply provided by the closing of relay 16. The positive terminal of potentiometer 51 is connected at all times during conduction of discharge device 26 and closure of relay 33 to the cathode of discharge device 36, while the adjustable tap of the potentiometer is connected to the negative side of timing capacitor 43.*

Since accurate and dependable control of the "weld time" is an important consideration we have provided a third control signal for discharge device 36, which is applied to the screen grid thereof and is operative to effect a "cut-off" control to assist in terminating conduction in discharge device 36 and to prevent subsequent untimely refiring thereof after the "weld time" period. In the illustrated embodiment of the invention we have connected a capacitor 54 and resistor 55 across the terminals 12' and 13' of power transformer 11. Connected between the said capacitor 54 and resistor 55 is a conductor 56 which is associated with the screen grid of discharge device 36 by means of conductor 57. The comparative values of capacitor 54 and resistor 55 are such that an alternating potential appears across conductors 56 and 14 which is substantially reversed in polarity with respect to that appearing across conductors 12 and 14, but is lagging in phase relationship by approximately twenty electrical degrees. Thus, assuming discharge device 36 to be conducting and its positive control grid bias from capacitor 43 to have been substantially dissipated whereby termination of conduction is impending, there is an interval of about one-fifteenth to one-twentieth of a full electrical cycle after the beginning of a positive half-cycle of anode-cathode potential wherein discharge device 36 must fire, *if at all*. At the end of this interval the screen grid signal becomes negative with respect to the cathode to prevent firing of the discharge device at a later point in the anode-cathode potential cycle. It will be understood, of course, that the screen grid signal will not affect the operation of the discharge device until such time as the positive control grid signal has been substantially dissipated, since the *latter* [later] signal, having a more sensitive and responsive control over the discharge device, easily overcomes the effect of the screen signal.

The "cut-off" and "lock-out" screen grid control as above set forth forms an important part of this invention since it prevents accidental triggering of discharge device 36 after the "weld time" period, and perhaps more important, insures that the discharge device, if it conducts at all, will conduct over substantially the entire half cycle. Being thus able to positively predict the performance of discharge device 36, it is possible to effectively prevent the occurrence of high current transients in the welding apparatus as will be understood.

After completion of a weld it is customary to hold the electrodes 23 in pressure contact with the work 24 for a certain period ("hold time") wherein the workpieces become properly fused together. Thus in the sequencing timer herein illustrated we have provided means which are operative to cause retraction of the electrodes 23 a predetermined time after the termination of the "weld time" period. The means referred to includes a discharge device 58, the anode of which connects conductor 14 through potentiometer 59 and resistor 60, and the cathode of which is connected to contacts 16a *of* [or] relay 16 through a switch 61. A conductor 63 connects the anode of discharge device 58 with the control grid of discharge device 15 whereby a highly negative signal is impressed upon discharge device 15 when discharge device 58 is conducting. A capacitor 62 is connected in parallel with resistor 60 and potentiometer 59 whereby the pulsating energy passed by discharge device 58 may be stored so that the control grid signal impressed upon discharge device 15 is of a relatively non-pulsating nature.

With the arrangement thus described it will be understood that by causing discharge device 58 to become conductive, discharge device 15 will be rendered non-conductive, deenergizing relay 16 to cause retraction of the electrodes 23 and to end a welding cycle. To fire discharge device 58 at the proper time we provide another discharge device 64, the cathode of which is connected to conductor 14, and the anode of which is connected to conductor 12 through a time constant network comprising resistors 65 and 66, potentiometer 67 and capacitor 68. Discharge device 64, being in direct communication with the power transformer 11 begins to conduct immediately upon power being applied thereto from the source 10 and accordingly maintains a full charge on capacitor 68. Thus, by connecting the control grid of discharge device 58 to the anode of discharge device 64, we provide that discharge device 58 will be maintained in a non-conductive state at all times when discharge device 64 is conducting, and that upon the last mentioned discharge device being rendered non-conductive, discharge device 58 will be fired after a predetermined delay period wherein the charge upon capacitor 68 is dissipated.

Preferably discharge device 64 is rendered non-conductive at the end of the "weld time" period and in the illustrated embodiment of our invention we effect this by connecting the screen grid of discharge device 64, through conductors 69 and 70, to the negative terminal of capacitor 52, whereby when discharge device 26 is conducting a highly negative screen grid signal will be impressed upon discharge device 64. An impulse transformer 71, the secondary of which is connected in series with conductor 69 and the primary of which is connected in parallel with relay 37, impresses a positive signal upon the screen grid of discharge device 64 while discharge device 36 is conducting, and it will be understood that when discharge device 36 stops conducting, ending the "weld time" period, discharge device 64 will be immediately extinguished by the negative screen grid signal from capacitor 52. "Hold time" is then provided by charged capacitor 68 which must be discharged through the network associated therewith before discharge device 58 begins to conduct.

In the illustration, switch 61 is set for non-recycling operation. By this arrangement the cathode of discharge device 58 may be connected to the power conductor 12 through contacts 16a of relay 16 and through foot switch 17. Thus assuming foot switch 17 to be open, discharge device 58 will conduct but momentarily to extinguish discharge device 15 and deenergize relay 16. When relay 16 is deenergized, anode-cathode potential is removed from all discharge devices with the exception of discharge device 64 which again begins to conduct to charge capacitor 68. To initiate a new cycle the machine operator must close foot switch 17 whereby the sequence of operations takes place in the usual manner.

In the event that the operator inadvertently holds the foot switch 17 closed too long anode-cathode potential will be applied to discharge device 58 even though relay 16 is deenergized. Thus a hold-off bias is maintained on discharge device 15 and the latter cannot fire to initiate a new cycle. Discharge device 64 must also be maintained non-conductive during this time and to accomplish this we have connected its control grid, though switch 61, to the anode of discharge device 58. The negative signal provided thereby takes the place of the negative screen signal which is removed when relay 16 is deenergized to extinguish discharge device 26. It will thus be apparent that even though switch 17 is held closed, a new cycle of operations cannot be initiated until the switch 17 is opened to extinguish discharge device 58 and then reclosed to fire discharge device 15.

For automatic recycling operation switch 61 is moved to the other of its indicated operative positions whereby the cathode of discharge device 58 is connected to contacts 16b of relay 16 and the control grid of discharge device 64 is connected to the anode of discharge device 15. Switch 17 is held closed by the operator or if desired by other suitable means, not shown. Thus, when discharge device 58 fires to render discharge device 15 non-conducting a highly positive signal is placed on the control grid of discharge device 64 from the anode of discharge device 15. Discharge device 64 accordingly fires immediately to charge capacitor 68. Discharge device 58 fires but momentarily since its anode-cathode potential is removed when relay 16 is deenergized, and thus discharge device 15 will refire to initiate a new cycle after a predetermeined "off time" period wherein the charge on capacitor 62 is dissipated to remove the control grid hold-off bias therefrom. Recycling may, of course, be discontinued at any time by merely opening switch 17.

As will be understood, in non-recycling operation "off-time" is not included as one of the sequentially related control periods since in some instances it is desirable to initiate a new cycle of operations substantially instantaneously upon the termination of a preceding cycle. To effect such instantaneous reinitiation of cycles the charge on capacitor 62, which provides a negative bias for extinguishing discharge device 15, must be rapidly dissipated to remove such negative bias and permit discharge device 15 to refire as soon as possible. For this purpose we have provided, in parallel with capacitor 62, a low resistance discharge path including switch 61 and resistors 74 and 75. The arrangement is such that when switch 61 is set for non-recycling operation low value resistances 74 and 75 are in parallel with capacitor 62 and the charge thereon may thus be quickly dissipated through the said resistances 74 and 75 as well as through resistances 59 and 60. When switch 61 is set for automatic recycling operation the low resistance path is interrupted whereby capacitor 62 discharges through resistors 59 and 60 in the usual manner to provide the desired predetermined "off time" period.

For set-up work and test operations wherein it is not desirable to energize the weld contactor 40, switch 72 may be moved to disconnect relay 37 and substitute in its place a resistance 73 of equivalent load value. The overall operation of the control circuit is not affected.

It should now be apparent that we have accomplished the objects initially set forth. The novel control circuit herein described in its preferred form, utilizes but five electronic discharge devices to obtain accurate and dependable control of four sequentially related periods of timed duration; i. e., "squeeze time," "weld time," "hold time" and "off time." The timing accuracy of our control is subject to negligible variation regardless of relatively wide variations in the potential supplied by the source 10. This we have accomplished by providing capacitor-potentiometer time constant networks to control each of the time periods, each of which networks operates on a discharging R–C time curve. This arrangement is inherently accurate as will be understood since the discharge time remains substantially constant over wide ranges of capacitor charge.

For controlling the critical "weld time" period we have provided means which operate independently of any of the discharge devices to time out and extinguish discharge device 36. In this respect it will be particularly noted that charged capacitor 43 renders discharge device 36 conductive by placing a highly positive control grid signal thereon, and then *operates later to render it non-conductive as the charge is dissipated to a point where the negative signal from network 51–52 predominates. This arrangement is for all practical purposes substantially foolproof in that before the positively charged capacitor 43*

*can be connected into the grid circuit of discharge device 36 to render the same conductive the negative signal generator 51–52 must also be operatively connected into the circuit. And in the event discharge device 26 should fail during a weld time period whereby the negative signal generator 51–52 becomes inoperative, relay 33 also becomes deenergized to open the anode-cathode circuit for discharge device 36* [renders it again non-conductive as the charge is dissipated. This method of operation is for all practical purposes fool-proof in that capacitor 43 must be connected into the control grid circuit to fire discharge device 36 and thus necessarily assures that the latter will be rendered non-conductive at the proper time. Should relay 33 for any reason become deenergized whereby capacitor 43 would be disconnected from the grid circuit of discharge device 36, the anode-cathode potential is also removed to prevent further conduction.] Thus any untimely breakdown of the circuit components, if such is to affect the "weld time" period at all, will cause it to end prematurely, and will in no instance cause overtiming of the period whereby the work and/or machine might be severely damaged.

In addition to the novel time control arrangement described above we have further provided a synchronized cut-off control which insures that discharge device 36 will conduct over substantially the entire half cycle, or not at all. This control is effected by providing a phase-shifted screen grid signal which is generally opposite in polarity to the anode potential of discharge device 36, but which is lagging in phase relation by approximately twenty electrical degrees. Thus, if the control grid signal is not sufficiently strong to trigger the discharge device in the first portion of the anode potential cycle it cannot thereafter cause conduction due to the opposing negative signal applied on the screen grid. With this arrangement we assure conduction over a full half cycle whereby undesirable transient currents in the welding apparatus may be minimized. It will also be noted that the cut-off control provided by our circuit will have no effect on the operation of discharge device 36 until the "weld time" has been substantially timed out by discharge of capacitor 43. The cut-off signal may thus be applied continuously to discharge device 36 as in the illustrated circuit.

Our timer finds inherent advantages in the use of alternating current in that relays 16, 33 and 37 are each operated by half-wave rectifying discharge devices and it is thus assured that the said relays will be energized on a cycle of one polarity only. Design considerations of the circuit are thereby minimized since transient currents are more easily avoided. The use of alternating current is further advantageous in that it is readily available from commercial sources whereas direct current power must ordinarily be supplied by providing additional rectifying and regulating components in the control circuit. Initial investment and maintenance expense are accordingly higher in the latter case.

The above specifically described embodiment should be considered as illustrative only, and reference should be had to the appended claims in determining the true scope of our invention.

We claim:

[1. In a control circuit for controlling a plurality of sequentially related operations of a welding machine of the type having electrodes, means to move said electrodes, and a contactor for controlling the flow of weld current to said electrodes; the combination of an alternating current power source, a first grid-controlled gaseous discharge device connected to said power source, a switch for energizing said first discharge device, a first switching relay adapted to be energized in response to conduction in said first discharge device, said means to move being operative upon energization of said relay to move said electrodes into contact with workpieces to be welded, a second gaseous discharge device connected to said power source through normally open contacts of said first relay, said second discharge device being connected in anti-parallel relation to said first discharge device, a control grid circuit for said second discharge device including a capacitor-potentiometer time constant network, means operative prior to energization of said first relay to charge said capacitor whereby a negative grid signal is placed on said second discharge device to maintain the same non-conductive, the arrangement being such that said capacitor will begin to discharge upon energization of said first relay to render said second discharge device conductive a predetermined time thereafter, a second relay adapted to be energized in response to conduction in said second discharge device, a third gaseous discharge device connected to said source through normally open contacts of said first and second relays, a control grid circuit for said third discharge device including a capacitor-potentiometer time constant network, said last mentioned network including normally open contacts of said second relay, means for charging said capacitor whereby when said last mentioned normally open contacts are closed a positive grid signal is placed on said third discharge device to render the same conductive, said charging means including normally closed contacts of said second relay, a third switching relay adapted to be energized in response to conduction in said third discharge device, means responsive to the energization of said last mentioned relay to energize said contactor, a fourth gaseous discharge device connected to said power source in parallel relation to said third discharge device, a screen grid circuit for said last mentioned discharge device including impulse translating means operative in response to conduction in said third discharge device to place a positive screen grid signal on said fourth discharge device and means operative in response to conduction in said second discharge device to place an opposing negative signal on said fourth discharge device, said last mentioned positive signal being of greater magnitude than said opposing negative signal, a capacitor-potentiometer time constant network connected in series with the anode-cathode circuit of said fourth discharge device, a fifth gaseous discharge device connected to said source through normally open contacts of said first relay, said fifth discharge device being connected in anti-parallel relation to said fourth discharge device, a control grid circuit for said fifth discharge device including conductor means connected to said last mentioned time constant network, the arrangement being such that when said fourth discharge device is conducting and for a predetermined time thereafter a negative grid signal is placed on said fifth discharge device to render the same nonconductive, and a control grid circuit for said first discharge device including conductor means connected to the anode of said fifth discharge device whereby a negative grid signal is placed on said first discharge device when said fifth discharge device is conducting.]

[2. In a control circuit for timing a plurality of sequentially related operations the combination of a power source, a first gaseous discharge device connected to said source, a switch for energizing said first discharge device, a switching relay adapated to be energized in response to conduction in said first discharge device, a second gaseous discharge device connected to said source through normally open contacts of said first relay, said second discharge device being connected in anti-parallel with said first discharge device, a control grid circuit for said second discharge device including a capacitor-potentiometer time constant network, means for charging said capacitor while said first relay is deenergized whereby a negative grid signal is placed on said second discharge device, a second switching relay adapted to be energized in response to conduction in said second discharge device, a third gaseous discharge device connected to said source through normally open contacts of one of said relays, a grid circuit for said second discharge device including a capacitor-potentiometer time constant network and normally open contacts of said second relay, means to charge said last mentioned capacitor including normally closed contacts of said second relay, the arrangement being such that when said last mentioned normally open contacts are closed a positive control grid signal is placed on said third discharge device, means associated with said last mentioned grid circuit and said second discharge device operative when said second discharge device is conducting to place a negative control grid bias on said third discharge device, said positive signal being initially of greater magnitude than said negative bias, and means responsive to the cessation of conduction in said third discharge device and operative a predetermined time thereafter to terminate conduction in said first discharge device.]

[3. Apparatus according to claim 2 further characterized by said third discharge device having a screen grid and control circuit therefor, said control circuit including phase shifting means associated with said source adapted to place a screen grid signal on said third discharge device which is generally reversed in polarity to the anode-cathode potential of said third discharge device and is lagging in phase relationship by an angle in the order of twenty electrical degrees, the arrangement being such that if said third discharge device is not rendered conductive by said control grid signals in the first portion of the anode-cathode potential cycle said screen grid signal will thereafter prevent conduction therein for the remaining portion of the cycle.]

[4. In a control circuit for welding apparatus of the type having electrodes movable toward and away from work pieces and a weld contactor for controlling the flow of weld current, the combination of a power source, a switching relay, means for energizing said relay, a first gaseous discharge device connected to said source through normally open contacts of said relay, means associated with said relay operative upon energization thereof to cause said electrodes to move into contact with said workpieces, a grid control circuit for said first discharge device including a capacitor-potentionmeter time constant network, means associated with said source and said time constant network adapted to charge said capacitor when said relay is deenergized whereby a negative grid signal is placed on said first discharge device, the arrangement being such that said charging means are rendered ineffective upon energization of said relay whereby said capacitor is discharged to render said first discharge device conductive a predetermined time subsequent to energization of said relay, a second switching relay adapted to be energized in response to conduction in said first discharge device, a second gaseous discharge device connected to said source through normally open contacts of one of said relays, switching means operative in response to conduction in said second discharge device to energize said weld contactor, a control grid circuit for said second discharge device including a capacitor-potentiometer time constant circuit and normally open contacts of said second relay, charging means for said last mentioned capacitor including normally closed contacts of said second relay, the arrangement being such that when said second relay is energized a positive control grid signal is placed on said second discharge device, means associated with said last mentioned control grid circuit and said first discharge device operative in response to conduction in said first discharge device to place a negative control grid bias on said second discharge device, said positive signal being initially of greater magnitude than said negative bias, and means responsive to the termination of conduction in said second discharge device and operative a predetermined time thereafter to deenergize said first relay.]

[5. Apparatus according to claim 4 further characterized by said means responsive to the termination of conduction in said second discharge device comprising a third gaseous discharge device connected to said source, means associated with said first and third discharge devices operative in response to conduction in said first discharge device to place a negative grid bias on said third discharge device, means associated with said second and third discharge devices operative in response to conduction in said second discharge device to place a positive grid signal on said third discharge device, said positive grid signal being of greater magnitude than said negative grid bias, and means associated with said third discharge device and said first relay operative in response to termination of conduction in said third discharge device to deenergize said first relay a predetermined time thereafter.]

[6. In a control circuit for electric resistance welding apparatus of the type having a weld contactor adapted to control the flow of weld current the combination of a source of pulsating power, a gaseous discharge device having an anode, cathode and control grid, said anode and cathode being connected to said power source, switching means for controlling the application of anode-cathode potential to said discharge device, a control grid circuit for said discharge device including a capacitor-potentiometer time constant network, means to charge said capacitor, switching means for said control grid circuit having normally closed contacts connecting said capacitor with said charging means, and normally open contacts connecting said capacitor with said grid, the arrangement being such that when said normally open contacts are closed a positive control grid signal is placed on said discharge device to cause conduction therein, means associated with said grid circuit operative when said switching means is energized to place a negative grid bias on said discharge device, said positive signal being initially of greater magnitude than said negative bias, switching means associated with said discharge device operative in response to conduction therein to energize said weld contactor.]

[7. Apparatus according to claim 6 further characterized by said discharge device having a screen grid, means associated with said screen grid and said source of power adapted to place a control signal on said screen grid, said control signal being generally opposite in polarity to said anode-cathode potential and lagging in phase relationship by an angle in the order of twenty electrical degrees, the arrangement being such that if said positive signal does not cause conduction in said discharge device within the initial portion of the anode-cathode potential wave said screen signal will prevent conduction during the remaining portion of the wave.]

[8. Apparatus according to claim 6 further including a second discharge device connected to said source, means to energize said second discharge device and said switching means for controlling the application of anode-cathode potential to said first mentioned discharge device and said means to place a negative grid bias upon said first mentioned discharge device being operative in response to conduction in said second discharge device.]

[9. In a control circuit for electric resistance welding apparatus of the type having electrodes movable toward and away from workpieces and a weld contactor for controlling the flow of weld current, the combination of a source of power, means to cause said electrodes to move into contact with said workpieces, said means including a first gaseous discharge device, a second gaseous discharge device connected to said power source and adapted to be energized a predetermined time after movement of said electrodes into contact with said workpieces, a third gaseous discharge device having an anode, cathode and grid, said anode and cathode being connected to said source, a grid circuit for said third discharge device having a resistance member therein and a capacitor connectable into and out of said circuit in parallel with said resistance member, switching means operative in response to conduction in said second discharge device to connect said capacitor into said grid circuit, charging means for said capacitor, switching means normally connecting said capacitor to said charging means operative in response to conduction in said second discharge device to disconnect said charging means, the arrangement being such that said capacitor when charged and connected in said grid circuit will render said third discharge device conductive for a predetermined time interval wherein said capacitor discharges through said resistance member, and means responsive to conduction in said second discharge device for applying a blocking control bias to said third discharge device, said blocking bias being operative to extinguish said third discharge device after said predetermined time interval.]

[10. In a timing circuit for electric resistance welding apparatus of the type having a weld contactor for controlling the flow of welding energy the combination of a gaseous discharge device of the type having an anode, cathode and control grid, a source of alternating current power connecting said anode and cathode, a grid circuit for applying a control signal on said discharge device including a resistance member and a capacitor associated in parallel with said resistance member, charging means for said capacitor, switching means in said grid circuit having normally open and normally closed contacts, said charging means being connected to said capacitor through said normally closed contacts said capacitor being connected to said resistance member through said normally open contacts, the arrangement being such that said capacitor when charged and connected to said resistance member will render said discharge device conductive for a predetermined time wherein said capacitor discharges through said resistance member, and means operative responsive to energization of said switching means to apply a blocking control bias to said discharge device, said blocking bias being operative to extinguish said discharge device after said predetermined time interval.]

[11. Apparatus according to claim 10 further including means to impress a second control signal on said discharge device, said second control signal being generally reversed in polarity to said anode-cathode potential and lagging in phase relationship by an angle in the order of twenty electrical degrees, the arrangement being such that if said first signal does not render said discharge device conductive in the initial portion of the anode-cathode potential wave said second signal will prevent conduction during the remaining portion of said wave.]

*12. In a welder timing and sequencing circuit of the type having means for effecting a plurality of timed control periods the combination of a power source, a first discharge valve, means to render said first valve conducting including a first relay, a second relay, a first anode circuit for said first valve including the operating coil of said second relay, a second discharge valve, anode-cathode circuit means for said second valve including normally open contacts of said second relay, a second anode circuit for said first valve including an impedance network, means connecting one terminal of said network to the control grid electrode of said second valve, means connecting the other terminal of said network to the cathode electrode of said second valve including normally open contacts of said second relay, said network being energizable in response to conduction in said first valve and being operatively associated with said second valve in response to the energization of said second relay whereby to impress a negative control grid signal upon said second valve tending to render and maintain the latter in a non-conductive condition, means including a capacitor and normally open contacts of said second relay to impress a timed positive control signal upon said second valve to overcome said negative signal, and means actuated in response to conduction in said second valve*

*to cause welding current to flow while said second valve is conducting.*

*13. Apparatus according to claim 12 further including a third discharge valve, means connecting said third valve to said source and normally maintaining the same in a conductive condition, a third anode circuit for said first valve including impedance means, means interconnecting said third anode circuit and the control electrode element of said third valve whereby in response to conduction in said first valve a negative control signal is impressed upon the grid electrode of said third valve tending to render and maintain the same non-conductive, and an auxiliary anode circuit for said second valve including impedance means and means coupled with said last mentioned grid electrode whereby in response to conduction in said second valve a positive control signal is impressed upon said last mentioned grid electrode overcoming said negative control signal and maintaining conduction in said third valve.*

*14. Apparatus according to claim 12 further characterized by said means actuated in response to conduction in said second valve comprising a relay connected in an anode circuit for said second valve, and further including means to insure substantially full half-cycle conduction in said second valve during its conducting periods comprising a source of alternating control potential which is generally reversed in polarity to the anode-cathode potential of said second valve and lagging in phase relationship by an angle in the order of twenty electrical degrees, and means connecting said source of alternating control potential to a grid electrode of said second valve.*

*15. In a welder timing and sequencing circuit of the type having means for effecting a plurality of timed control periods the combination of a power source, a first discharge valve, means to render said first valve conducting including a first relay, a second relay, a first anode circuit for said first valve including the operating coil of said second relay, a second discharge valve, anode-cathode circuit means for said second valve including normally open contacts of said second relay, a second anode circuit for said first valve including a capacitor-potentiometer network, means connecting one terminal of said network to the control grid electrode of said second valve, means connecting the other terminal of said network to the cathode electrode of said second valve including normally open contacts of said second relay, said network being energizable in response to conduction in said first valve and being operatively associated with said second valve in response to the energization of said second relay whereby to mipress a negative control grid signal upon said second valve tending to render and maintain the latter in a non-conductive condition, means including normally open contacts of said second relay to impress a timed positive control grid signal upon said second valve to overcome said negative signal, and means actuated in response to conduction in said second valve to cause welding current to flow while said second valve is conducting.*

References Cited in the file of this patent or the original patent

UNITED STATES PATENTS

| | | |
|---|---|---|
| 2,306,791 | Moe | Dec. 29, 1942 |
| 2,327,268 | Jenks | Aug. 17, 1943 |
| 2,586,592 | Alcorn | Feb. 19, 1952 |
| 2,590,582 | Stadum | Mar. 25, 1952 |
| 2,631,524 | Thiesen | Mar. 17, 1953 |
| 2,639,361 | Hartwig | May 19, 1953 |